(12) United States Patent
Noe et al.

(10) Patent No.: US 6,644,159 B2
(45) Date of Patent: Nov. 11, 2003

(54) TRIMMER FOR STRIP AND SCRAP CUTTER

(75) Inventors: Andreas Noe, Kerken (DE); Rolf Noe, Mülheim/Ruhr (DE); Ertan Yildirimman, Mülheim/Ruhr (DE)

(73) Assignee: BWG Bergwerk- und Walzwerk-Maschinenbau GmbH, Duisburg (DE)

( * ) Notice: Subject to any disclaimer, the term of this patent is extended or adjusted under 35 U.S.C. 154(b) by 78 days.

(21) Appl. No.: 09/835,290

(22) Filed: Apr. 13, 2001

(65) Prior Publication Data

US 2002/0020269 A1 Feb. 21, 2002

(30) Foreign Application Priority Data

Jun. 2, 2000 (DE) .......................... 100 27 470

(51) Int. Cl.⁷ ................................. B26D 1/18
(52) U.S. Cl. .................. 83/498; 83/482; 83/477; 83/483; 83/487; 83/488
(58) Field of Search .................... 83/869, 872, 160, 83/706, 515, 516, 489, 503, 482, 477, 487, 488

(56) References Cited

U.S. PATENT DOCUMENTS

| | | | | |
|---|---|---|---|---|
| 2,014,248 A | * | 9/1935 | Evans | 83/302 |
| 3,080,783 A | * | 3/1963 | Knepshield | 83/479 |
| 3,260,146 A | * | 7/1966 | Child | 83/479 |
| 3,426,634 A | * | 2/1969 | Richel | 83/355 |
| 3,605,541 A | * | 9/1971 | Ruben et al. | 83/355 |
| 3,777,608 A | * | 12/1973 | Kopf et al. | 83/517 |
| 4,058,041 A | * | 11/1977 | Ito | 83/305 |
| 4,501,177 A | * | 2/1985 | Logan et al. | 83/105 |
| 4,520,704 A | * | 6/1985 | Olshansky et al. | 83/499 |
| 4,527,454 A | * | 7/1985 | Walter | 83/499 |
| 4,627,320 A | * | 12/1986 | Fuccaro | 83/163 |
| 4,676,133 A | * | 6/1987 | Fujimura | 83/497 |
| 4,784,030 A | * | 11/1988 | Waring | 83/105 |
| 4,964,324 A | * | 10/1990 | Pavlick | 83/302 |
| 5,007,318 A | * | 4/1991 | Cox et al. | 83/425.2 |
| 5,363,729 A | * | 11/1994 | Ogasawara | 83/389 |
| 5,562,008 A | * | 10/1996 | Lordo | 83/39 |
| 5,669,279 A | * | 9/1997 | Sohl et al. | 83/425.2 |
| 5,964,136 A | * | 10/1999 | Bittner | 83/498 |

\* cited by examiner

*Primary Examiner*—Allan N. Shoap
*Assistant Examiner*—Phong Nguyen
(74) *Attorney, Agent, or Firm*—Herbert Dubno

(57) ABSTRACT

A trimming apparatus for metal strip has trimming heads on opposite sides of a turntable along each edge of the strip so that the trimming heads can be rotated into the trimming position or into the maintenance and blade-replacement positions. On each of the turntables as well a scrap-strip cutter is associated with the respective trimming head and the scrap-strip cutters are disposed diagonally opposite one another across the turntable and each trimming head and its scrap-strip cutter on one side of the turntable is connected to a clutch half on the opposite side of that turntable so that the scrap-strip cutter and the trimmer are driven by a common drive.

9 Claims, 5 Drawing Sheets

TRIMMER FOR STRIP AND SCRAP CUTTER

FIELD OF THE INVENTION

Our present invention relates to an apparatus for the trimming of strip, especially metal strip, and for cutting up the scrap which is produced by the strip trimming.

BACKGROUND OF THE INVENTION

In the field of strip trimming it is known to provide a pair of trimmers on opposite sides of a strip processing line, especially a line for processing metal strip, to trim off edge portions of the strip. For that purpose, the trimmers may be provided with turntables which can have trimming heads on opposite sides thereof and which are rotated from trimming positions in which respective heads engage the strip, into readiness positions in which the cutters of the head can be replaced while another head is effective for trimming action.

Metal strip, metal sheets and metal plates are usually trimmed alongside edges to form a strip or sheet of a constant width and to remove strip or sheet irregularities or defects which tend to be represent along the edges of the strip or sheet to be trimmed. The trimming of metal strip, for example, is generally carried out in a strip treatment line and has a trimmer on each side of the strip. Each of the trimming heads, in turn, may be a pair of circular blades which can be adjusted in a direction transverse to the path of travel of the strip to vary the cutting gap and the closest blade to the center of the strip can be adjusted to define the width of the strip.

The cutting gaps of the circular blade pair and the relative positioning of the upper and lower blades can be selected to minimize the cutting burrs which may be formed and to increase the blade life. The scrap which is cut off, also in strip-like fashion, is generally cut up itself into narrow bands of widths of up to 15 mm by scrap cutters.

The scrap cutters can have blade drums formed with peripheral blades which can interdigitate with one another. The scrip strips which are formed by trimming can pass through passages of the trimming head between the blade drums of the scrap cutter and there can be chopped up into pieces whose length is a function of the blade spacing on the periphery of the blade drum. The chopped scrap can fall on a conveyor and can be transported out of the treatment line, e.g. to a furnace or scrap collector for remelting.

As noted, the upper and lower blades of the trimming head undergo wear and must be replaced from time to time. For this purpose, the trimmer turntable positions one of the trimmer heads in an operating position in which it participates in trimming of the strip while the other trimming head is in a readiness position in which it can undergo maintenance, sharpening, replacement or some other procedure.

The turntable can thus have one trimming head in a working position and the other trimming head in a blade-replacement position. The changeover from one head to the other can take only one to two minutes.

In general, the blade life of the scrap chopping head is as a rule longer than the blade life of the blades of the trimming heads. As a result of this greater life, the double trimmer of a turntable is usually combined with a single scrap chopper. This, however, can lead to significant problems. For example, there can be a backup of the scrap in the scrap channel which can result in standstill of the strip processing line. Edge defects can result in premature blade failure even where precautions are taken. As a consequence, the strip treatment lines may be equipped with tandem scrap choppers to minimize the duration of operation of the trimmer. Strip treatment lines with strip choppers arranged in tandem do indeed usually provide one of the strip choppers in an operating position while the other is in a maintenance or preparatory position. The tandem constructions known in the art, however, occupy considerable space and tandem arrangements usually cannot be applied to existing treatment lines and treatment lines cannot generally be equipped with tandem choppers in many instances.

It has been proposed to provide a turntable with two trimming heads with spaced-apart scrap choppers oriented at an angle of 90° to one another as seen in a plan view onto the turntable. This arrangement also requires a large amount of space, especially since the trimming heads and the choppers must be provided with the respective drives. Furthermore, relatively large turntables are required to provide, in addition to the two maintenance and blade replacement positions, appropriate mounts for the trimming heads and the chopping heads.

OBJECTS OF THE INVENTION

It is, therefore, the principal object of the present invention to provide an apparatus for trimming strip, especially metal strip, whereby the scrap which is produced can be cut up in a reliable and efficient manner but wherein the apparatus as a whole will be relatively compact and efficient.

Another object of this invention is to provide an apparatus for the trimming of strip and for cutting up the strip scrap which is produced whereby drawbacks of the aforedescribed systems are obviated.

It is also an object of this invention to provide a trimmer arrangement with improved scrap cutters such that the scrap cutters occupy a minimum of space and can operate reliably, efficiently and conveniently.

SUMMARY OF THE INVENTION

These objects and others which will become apparent hereinafter are attained, in accordance with the invention by providing a pair of trimming strip cutters, each of which is associated with a respective trimming head on the same side of a median plane through the turntable and such that the trimming strip or scrap cutter heads are all set at an angle of 180° from one another on opposite directions about the axis and as seen in a plan view of the turntable.

While the trimming heads are practically aligned with one another across the turntable and on opposite sides of this plane, the trimming strip cutter heads or scrap cutter heads are located along a diagonal, i.e. a diameter through the axis which is inclined to the common axis of the trimming head and thus spaced from the trimming head in opposite directions on either side of this plane. This has the consequence that relatively small turntables can be used. Furthermore, only a single readiness position, corresponding to the maintenance or blade replacement position, is required for the respective trimming head and scrap cutter. The displacement between the positions requires only a 180° rotation of the turntable to swing a respective trimming head and its scrap cutter from the operating position into the maintenance and blade replacement position and vice versa.

According to another feature of the invention, each turntable has only a single drive string for the trimming heads and the scrap cutting heads, the drive string as seen in a view lying at an angle of 90° to the plane and parallel to the common axis of the trimming heads and perpendicular to a common plane of the respective trimming head and the respective scrap cutter. The drive string is provided with a coupling which can engage the drives for one of the trimming heads and the respective scrap cutting head in one angular position of the turntable and can engage a transmission or drive unit for the other cutting head, the respective scrap cutter in the other angular position of the turntable. The drive string can include a clutch half, usually a jaw clutch half, which can engage in a complementary jaw half of the respective trimming head and scrap cutter drive or transmission. The coupling halves of the turntable with which the clutch half of the drive can engage, are also located on a diagonal across the turntable.

It has been found to be advantageous to provide the two trimming heads and their respective trimming strip cutting heads of the respective turntable in a common housing so that the overall assembly has a compact, easily maintained and inexpensive construction with a high degree of reliability and convenience for trimming strip and cutting up the trimming waste.

Because of the arrangement of the trimming heads and the scrap cutting heads in a single housing, the trimming waste passages can be relatively small. This reduces the danger of blockage of the trimming waste movement significantly. The longer the trimming waste passage, the greater is the risk that the trimming waste will interfere with operation of the strip handling line.

According to a further feature of the invention, the trimming heads or at least their lower blades and the trimming waste-cutting heads or their blade drums are driven by a common drive or motor. This is facilitated by the integration of the trimming heads and trimming waste cutting heads in a single housing.

Of course the trimming heads can basically operate also by entrainment along with the traveling strip and without having special drives.

In a preferred embodiment of the invention, the strip width setting of the turntable is determined by the spacing between the upper blades of the two trimmers plus twice the cutting gap between the upper blades and the lower blades of the trimming head.

To the extent that the strip-width setting depends upon the positions of the upper blades, the upper blades themselves can be made adjustable while the lower blades are not individually adjustable although the distance between the upper and lower blades can be varied. For this reason the adjustment of the respective cutting gap and the overlap of respective upper and lower blades for the trimming is preferably effected by means of adjustment of the upper blades.

According to still another feature of the invention the cutting gap of the scrap cutting head can also be adjustable to optimize the blade life of the cutting drum of the trimming strip cutting head.

Finally, it has been found that the mean distance between the trimming head and the associated trimming strip cutting head should be less than 2.5 times the blade diameter of the cutting head and should be as small as possible so that between the trimming head and the scrap cutting head a blockage of the cutting waste should not occur or should be able to be removed in a short period of time.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
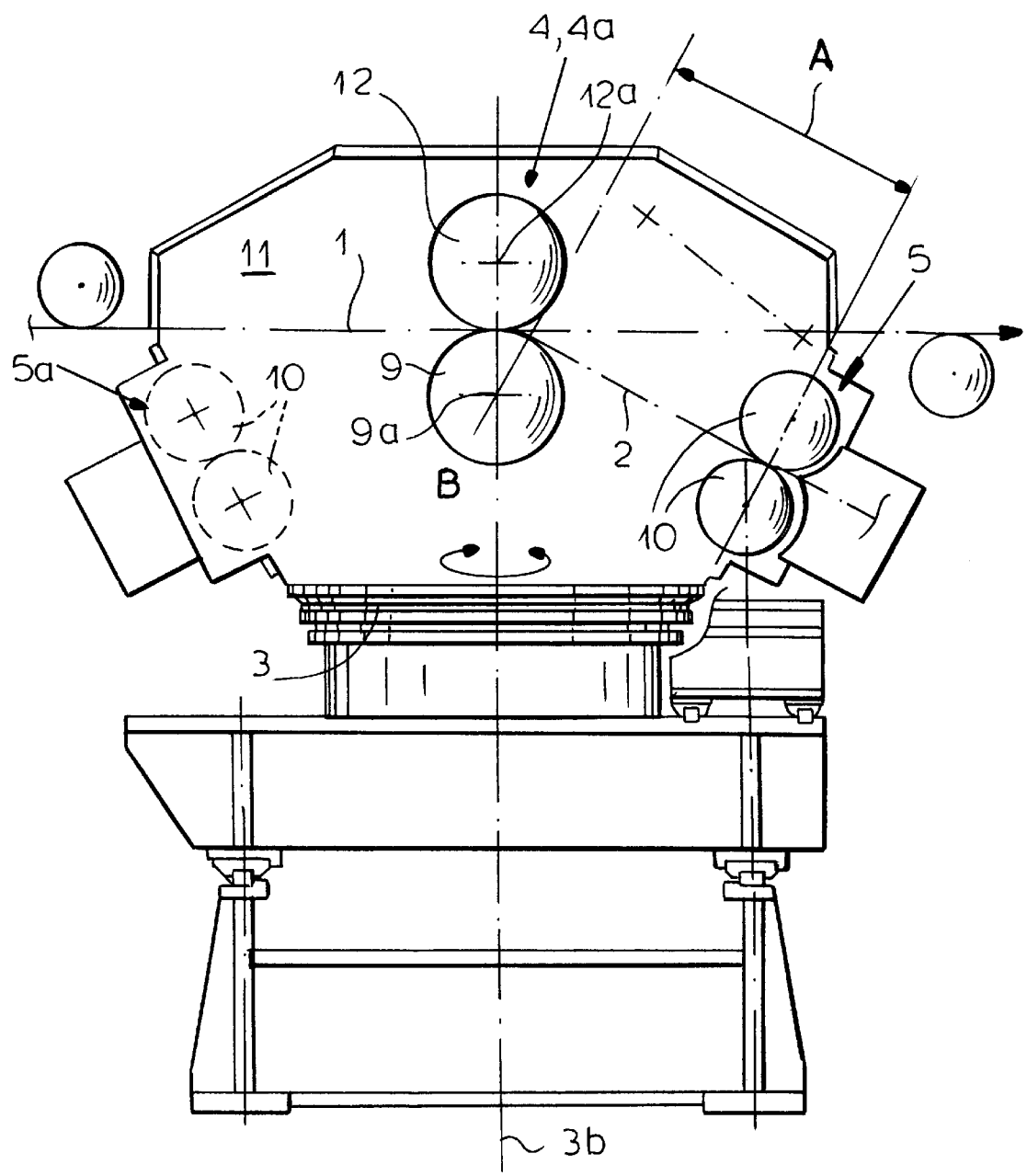
FIG. 1 is a schematic side elevational view of a trimming and trimming-waste cutter unit of a strip processing line.

In the drawing I have shown an apparatus for the trimming of a traveling metal strip 1 and for cutting up the trimming strips 2 which are produced by the trimming operation and can be referred to as scrap. The apparatus comprises on both sides of a median plane MP through the path of the strip 1, a respective turntable 3, 3a which can be adjustable by appropriate means, represented by the double-headed arrows 1a, toward and away from the median plane to adjust the width of the trimmed strip 1. For this purpose, the turntables may be mounted on carriers or supports 1b riding on rails 1c. The means for displacing the support 1b toward and away from the median plane M can be hydraulic cylinders.

The turntables 3 and 3a can each have a rotation axis 3b and can be rotatable therearound as shown the double-headed arrow 3c. Each turntable has two trimming heads 4, 4a and two scrap-strip cutters 5, 5a. As will be apparent from FIG. 2 in particular, the turntables 3 and 3a can have median planes lying along the axis 3b represented, for example at mp such that each trimming head 4 and the associated scrap cutter 5 or 4a and 5a lies on the respective side of the median plane mp which constitutes a plane of symmetry. The scrap-strip cutter and trimming head on each side of the turntable lie in line with one another or at 180° and in a line which is transverse to the strip 1 but parallel to the planes mp and MP. Each turntable 3, 3a has an operating position B at which trimming occurs and a readiness maintenance distance W which permits blade replacement.

Figure 3:
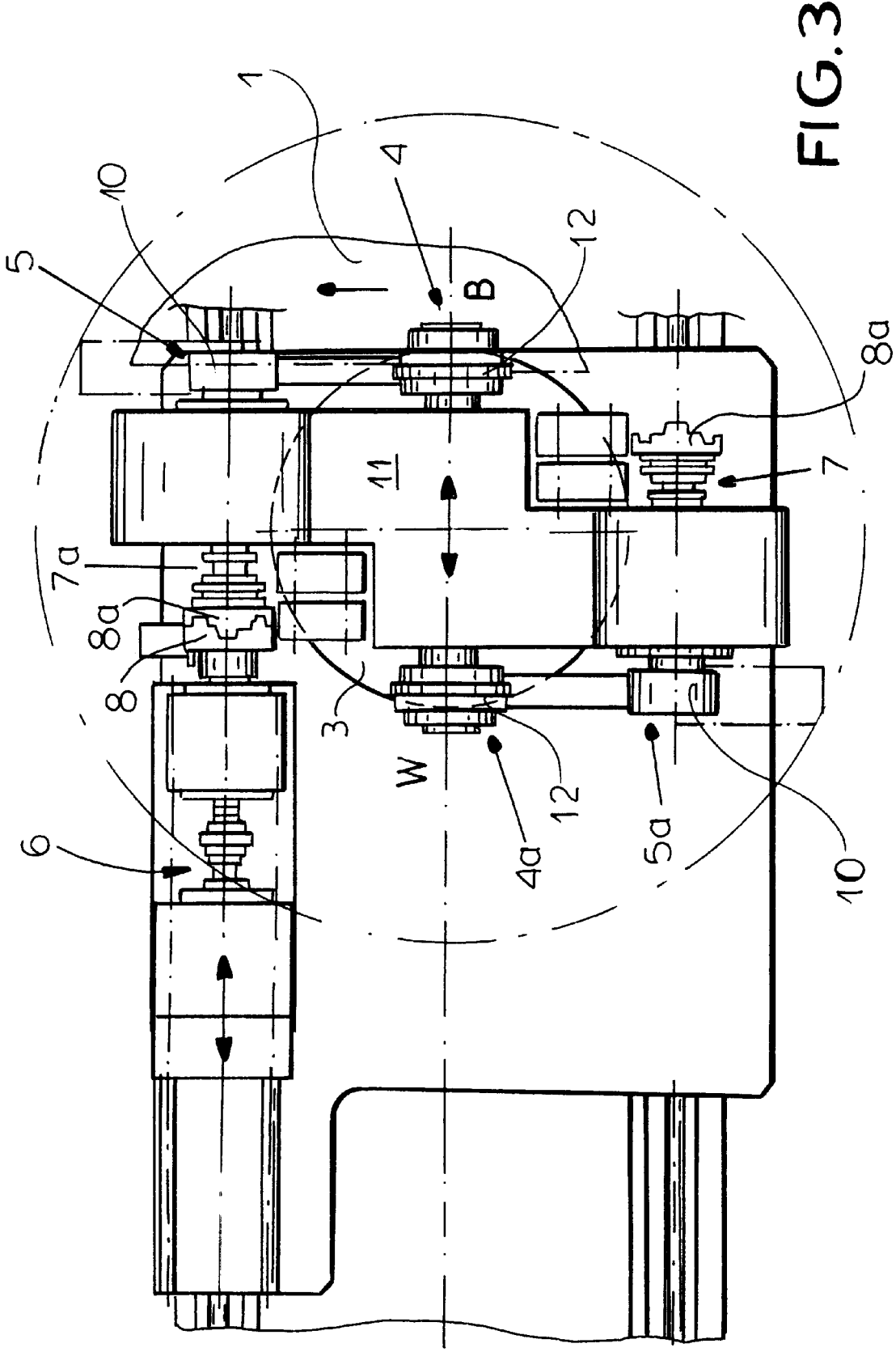
FIG. 3 is a plan view of the apparatus of FIG. 1.
Figure 4:
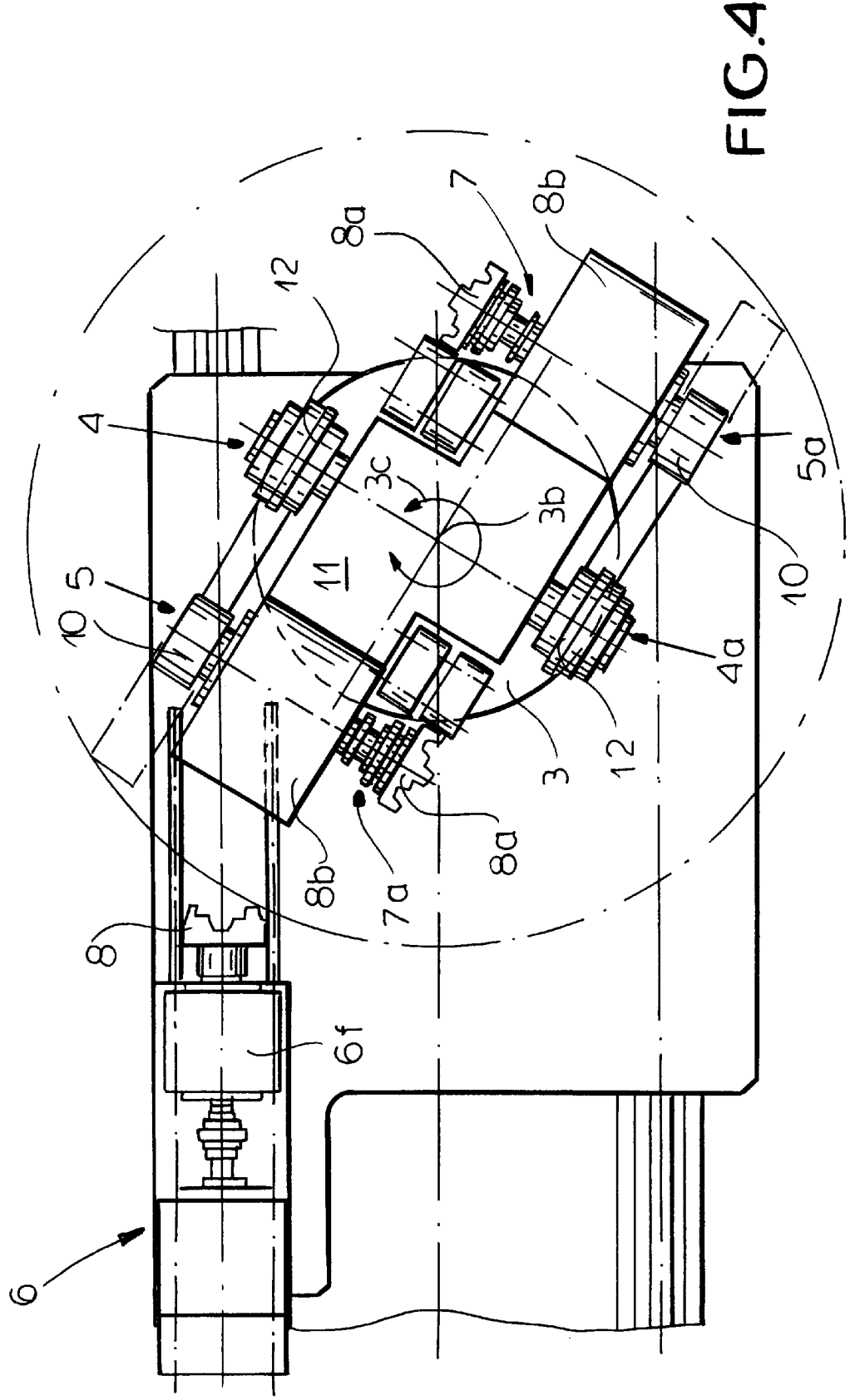
FIG. 4 is a view similar to FIG. 3 showing the displacement of a trimming head into the maintenance and blade-changing position.

Thus on each turntable 3, 3a the respective trimming heads 4, 4a with their associated scrap-strip cutters 5, 5a are at an angle of 180°, i.e. are diametrically opposite, as seen in a plan view on the turntable (FIG. 3).

In other words each scrap-strip cutter on one side of the median plane mp is offset from its trimming head in the opposite direction from the offset of the scrap-strip cutter associated with the other trimming head.

In addition, the trimming heads have blade axes 12a and, in the positions B and W, are perpendicular to the plane of the strip 1 to be trimmed and parallel to the median planes mp and MP.

Figure 2:
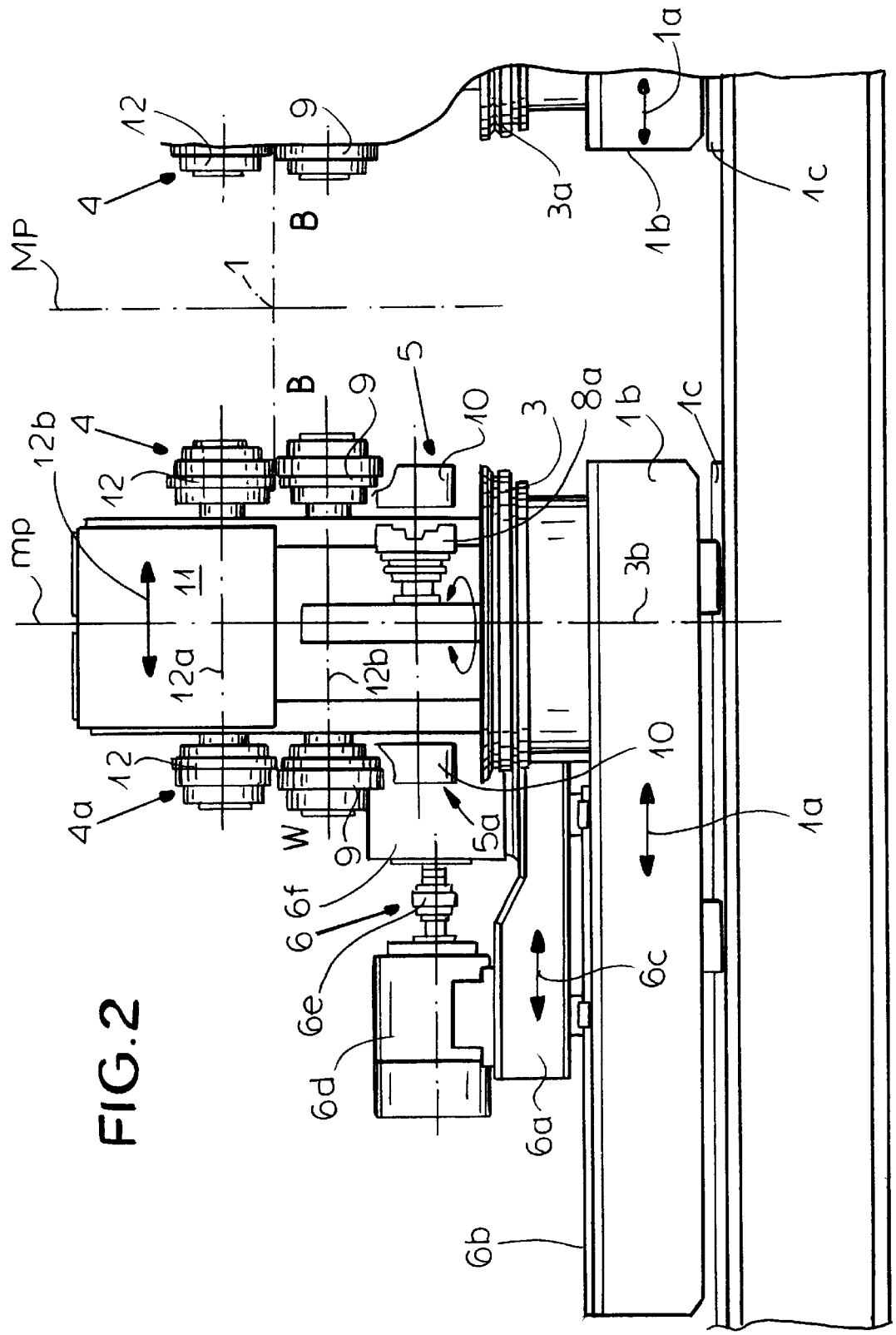
FIG. 2 is an end view of the unit of FIG. 1.

For each turntable 3, 3a there is a respective drive string 6 which can comprise, as can be seen especially in FIG. 2, a carriage 6a displaceable on rails 6b by a hydraulic actuator represented by the double-headed arrow 6c toward and away from the median plane MP and thus toward and away from the median plane MP and thus toward and away from the respective turntable. Each drive string can include an electric or hydraulic motor 6d, a shaft coupling 6e and a speed changing transmission 6f connected by the shaft coupling 6e to the motor 6d. The transmission 6f may carry a clutch half 8 of a jaw clutch engageable with a clutch half 8a connected to a respective distributing transmission 8b on the turntable and distributing the rotation imparted to the clutch half 8a to both the lower clutch 9 of the respective trimming head and to one of the blades 10 of respective scrap-strip cutter 5 or 5a.

The clutch halves 8a are located diagonally opposite one another across axis 3b and thus at an angle of 180° in opposite directions as seen in a plan view of the turntable.

As noted, the clutch halves 8a can be selectively connected to the clutch half 8, depending upon which of the clutch halves 8a is in alignment with the clutch half 8 in the particular angular position of the turntable and upon advance of the clutch half 8 into such an engagement. The clutch halves 8a are on the opposite sides of the median plane mp from the trimming head and scrap-strip cutter driven thereby. As also has been previously mentioned, each trimming head 4, 4a and the respective scrap-strip cutter have in common the transmissions 8b associated with the clutch half 8a on the opposite side of the turntable.

All of the trimming heads and scrap-strip cutters of a respective turntable 3, 3a are accommodated in a common housing.

Figure 5:
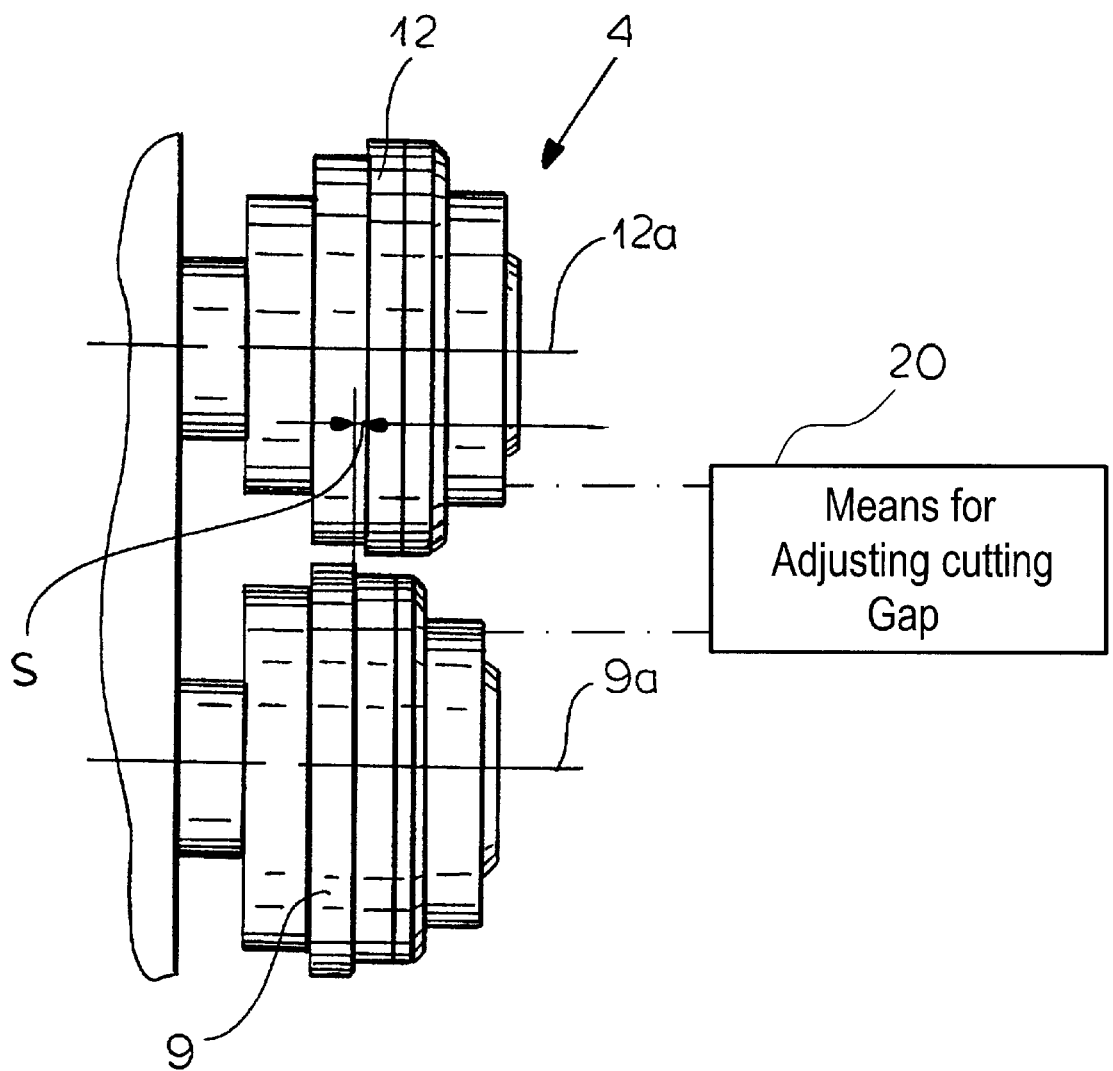
FIG. 5 is an enlarged detail view of the trimming head showing the gap between the upper blade and the lower blade.

The setting of the trimmed strip width is achieved by adjusting the spacing between the cutting edges of the upper rotary blades 12 of the two turntables via the actuators previously described and means 20 can be provided, in addition, for adjusting the cutting gap S (FIG. 5) between the blade edges. That means 20 has been represented by the double-headed arrow 12b in FIG. 2 and can be a hydraulic system. The cutting gap of the scrap-strip cutter head 5 is adjustable by similar means. The mean distance A between the trimming head 4, 4a and the respective scrap-strip cutter 5, 5a is smaller than 2½ times the blade diameter of the trimming head 4, 4a.

We claim:

1. An apparatus for trimming strip and cutting trimmed scrap comprising respective side trimmers flanking a path of strip to be trimmed, each of said trimmers having:
   a support shiftable transversely to said path;
   a respective turntable on each support rotatable about an axis perpendicular to a plane of said strip;
   respective diametrically opposite trimming heads on each turntable rotatable on said turntable about said axis between a trimming position wherein one of said heads is positioned to trim said strip while the other of said heads is located at a readiness position enabling blade maintenance, the trimming head on one side of said axis being aligned with the trimming head along and on an opposite side of said axis along a diameter of the respective turntable; and
   respective scrap-strip cutters spaced from the respective trimming heads in opposite directions, but on the same sides of the axis as the respective trimming heads and said scrap-strip cutters being further diagonally across from one another on the respective turntable so that the trimming heads and their respective scrap-strip cutters are located on opposite sides of a median plane through the respective turntable and are displaceable between said positions by rotation of the respective turntable through 180°, said scrap-strip cutters receiving trimming waste from the respective plane.

2. The apparatus defined in claim 1, further comprising a respective drive string for each of said turntables oriented at an angle of 180° in a plan view of the respective turntable and selectively engageable with oppositely positioned drives for each trimming head and the respective scrap-strip cutter for driving the heads and the cutters.

3. The apparatus defined in claim 2 wherein all of said trimming heads and said scrap-strip cutters of a respective turntable are received in a common housing.

4. The apparatus defined in claim 1 wherein each of said trimming heads has a respective rotatable lower blade and a respective rotatable upper blade, at least one of said blades being driven.

5. The apparatus defined in claim 4 wherein at least the lower blade of each of the trimming heads and the respective scrap-strip cutter have a common drive.

6. The apparatus defined in claim 4, further comprising means for adjusting the spacing between said turntables to set a given trimmed width of said strip between inner edges of the respective upper blades.

7. The apparatus defined in claim 4, further comprising means for adjusting a cutting gap between cooperating edges of said upper and lower blade of each of said trimming heads.

8. The apparatus defined in claim 4 wherein a mean distance A from the respective trimming head to the respective scrap-strip cutter is smaller than 2½ times the blade diameter of the respective trimming head.

9. The apparatus defined in claim 1 wherein said scrap-strip cutters have respective blades with an adjustable cutting gap.

* * * * *